United States Patent

[11] 3,590,783

| [72] | Inventor | Ray E. Purgett<br>Route 2, Owen, Wis. 54460 |
|---|---|---|
| [21] | Appl. No. | 832,064 |
| [22] | Filed | June 11, 1969 |
| [45] | Patented | July 6, 1971 |

[54] SAFETY COW TIE
4 Claims, 6 Drawing Figs.

| [52] | U.S. Cl. | 119/119 |
|---|---|---|
| [51] | Int. Cl. | A01k 01/06 |
| [50] | Field of Search | 119/119, 147, 118, 120, 147 |

[56] References Cited
UNITED STATES PATENTS

| 949,768 | 2/1910 | James | 119/119 |
|---|---|---|---|
| 2,294,781 | 9/1942 | Ingraham | 119/119 |
| 3,123,051 | 3/1964 | Berg | 119/119 |

Primary Examiner—Hugh R. Chamblee
Attorney—Robert M. Dunning

ABSTRACT: A cow-tie is provided including a tie bar having parallel U-shaped members at its ends which are detachably mounted on spaced stanchion bars of a stall. A flexible chain connects a center portion of the tie bar to a member encircling the neck of the cow. Movements of the head of the cow may slide the ends of the tie bar vertically along the stanchion bar.

PATENTED JUL 6 1971

INVENTOR
RAY E. PURGETT

BY [signature]
ATTORNEY

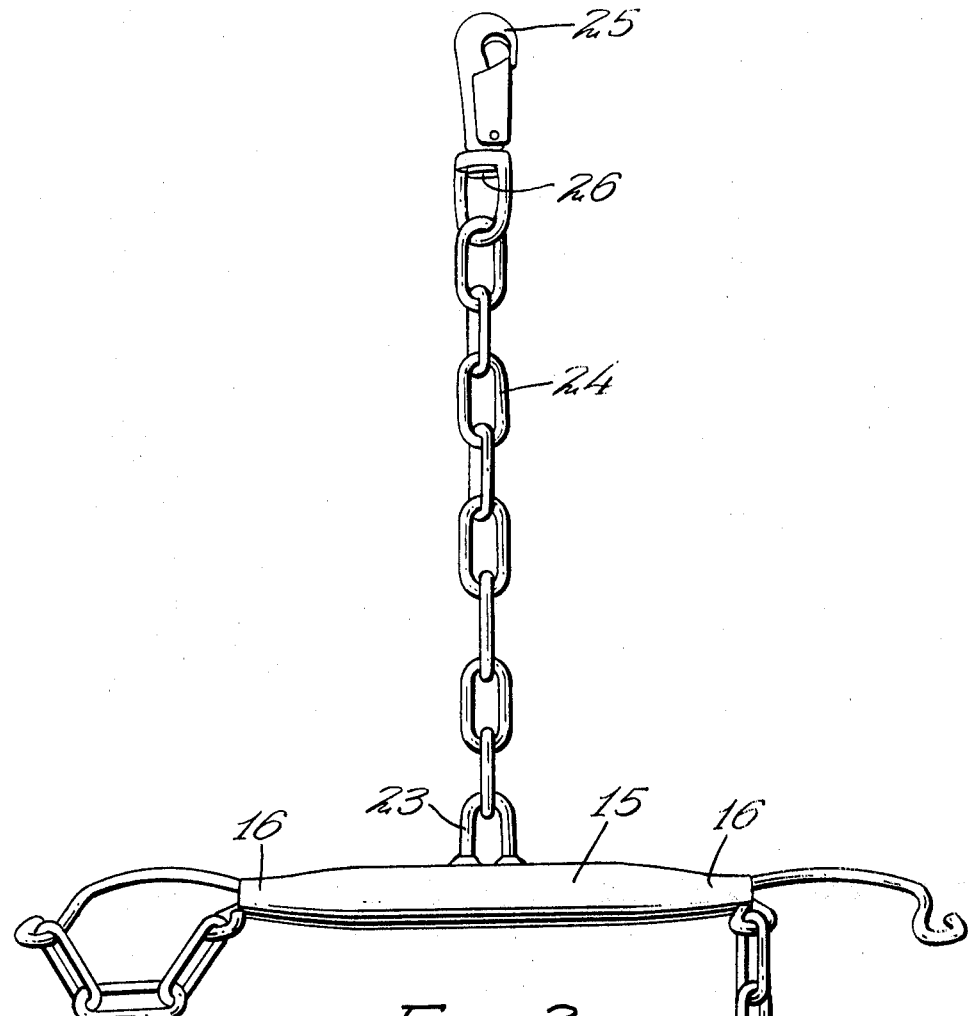

PATENTED JUL 6 1971 3,590,783

INVENTOR
RAY E. PURGETT

BY
ATTORNEY

SAFETY COW TIE

This invention relates to an improvement in cow tie for cattle, and deals particularly with a device for securing a cow or other such animal in proper position within a stall.

In the past, stanchions have been used to hold cows in their stalls. Such stanchions extend about the neck of the cow and permit the cow to either stand up or lie down in the stall, but do not permit any decided amount of movement forwardly or backwardly within the stall. In other words, the cow is very definitely confined and such stanchions are obviously uncomfortable for the animals and do not permit any appreciable amount of movement forwardly or backwardly in the stall for the cow being stanchioned.

Several patents have issued for tying devices designed to secure the cow in the stall, but at the same time to allow a certain amount of freedom. One such patent is U.S. Pat. No. 3,123,051 issued Mar. 3, 1964 to V.R. Berg. This patent discloses a belt or other flexible member designed to extend around the neck encircling member, and a pair of chains extending from the short length of chain and having terminal links designed to encircle the pair of stanchion bars on opposite sides of a slot at the forward end of each stall through which the head of the animal may extend. In the patent, the stanchion bars are relatively wide apart at their lower ends, and closer together at their upper ends. The arrangement is such that when the cow is standing up, the various chain members provide enough slack so that the animal is relatively free in movement, as long as the cow is retained in the stall. However, the lower ends of the stanchion bars on opposite sides of the front opening of the stall are spaced relatively wide apart. Thus when the cow is lying down, much less latitude is provided for movement, and the head of the cow must be positioned to extend between the stanchion bars.

A feature of the present invention resides in the provision of a device of the type described in which the animal confining means is detachably connected to the stanchion bars. As a result, the entire apparatus may be removed from the stall or replaced relative thereto for repair or replacement in a very short period of time. For example, if a longer chain is required to confine the cow while at the same time permitting proper latitude of the neck of the cow, the apparatus may be detached and replaced if so desired.

A further feature of the present invention resides in the provision of a device of the type described which insures the safety of the cow at all times while she is tied in the stall. Where chains provide the connecting means between neck of the cow and the stanchion bars on opposite sides of the stall opening through which the head of an animal is designed to extend, the front feet of the cow may become entangled in the chains making it difficult to free the animal without damage to its legs or skin. In the event a leg of the cow becomes entangled in a chain or similar flexible member, there is a tendency for the animal to panic, and to use every effort to become disentangled, even though this may mean injury to the leg or other parts of the animal. It is a purpose of the present invention to avoid previous difficulties of this type.

A feature of the present invention resides in the provision of a cow tie which includes a crossbar which may comprise a tubular member flattened at its ends, and supporting a pair of substantially parallel U-shaped members which are designed to encircle the vertical stanchion bars on opposite sides of the head opening and the forward end of the stall. The spaced ends of the U-shaped member are commonly connected by a short length of chain or other similar means so as to detachably hold the crossbar in vertical slidable relation upon the spaced parallel stanchion bars.

A further feature of the present invention resides in the provision of a connecting loop on the crossbar to which a chain is secured. The short lengths of chain which span the open sides of the U-shaped members are detachably connected, so that the entire device may be removed from the stanchion bars at any time as is desired, which differs somewhat drastically from the devices illustrated in the prior art. A short length of chain connects the midpoint of the transverse bar to the band or other flexible member encircling the neck of the cow, and a swivel fastener is provided between the length of chain and the animal neck band. This permits the animal to move backwardly in the stall, and allows free movement of the head while the animal is in a standing or laying position.

A further feature of this invention relates to a means on one of the stanchion bars for holding the tie bar in an elevated position extending across the opening between the stanchion bars. The tie bar may be manually engaged with this means prior to directing the cow into the stall. The tie bar may thus serve as a cattle stop to prevent the cow from attempting to jump through the space between the stanchion bars upon entering the stall. The tie bar is also held at a convenient height so that the tie bar may be conveniently fastened to the cow. After the cow is secured, the tie bar is released to slide downwardly on the stanchion bars.

A further feature of the present invention resides in the provision of a structure including a tie bar having end portions designed to encircle the stanchion bars on opposite sides of the neck of the animal, and including an anchoring or connecting loop for securing the tie bar to the chain attached to the belt or other flexible member encircling the neck of the animal. The connecting loop is arranged on a plane substantially 45° to a vertical plane through the axis of the tie bar, so that an upwardly and rearwardly pull upon the connecting chain will not create a binding action or cause the vertical slanting of the ends of the tie bar relative to the stanchion bars.

These and other objects and novel features of the present invention will be more clearly and fully set forth in the following specification and claims.

In the drawings forming a part of the specification.

FIG. 2 is an elevational view of the apparatus.

FIG. 3 is a plan view of the tie bar.

Figure 1:
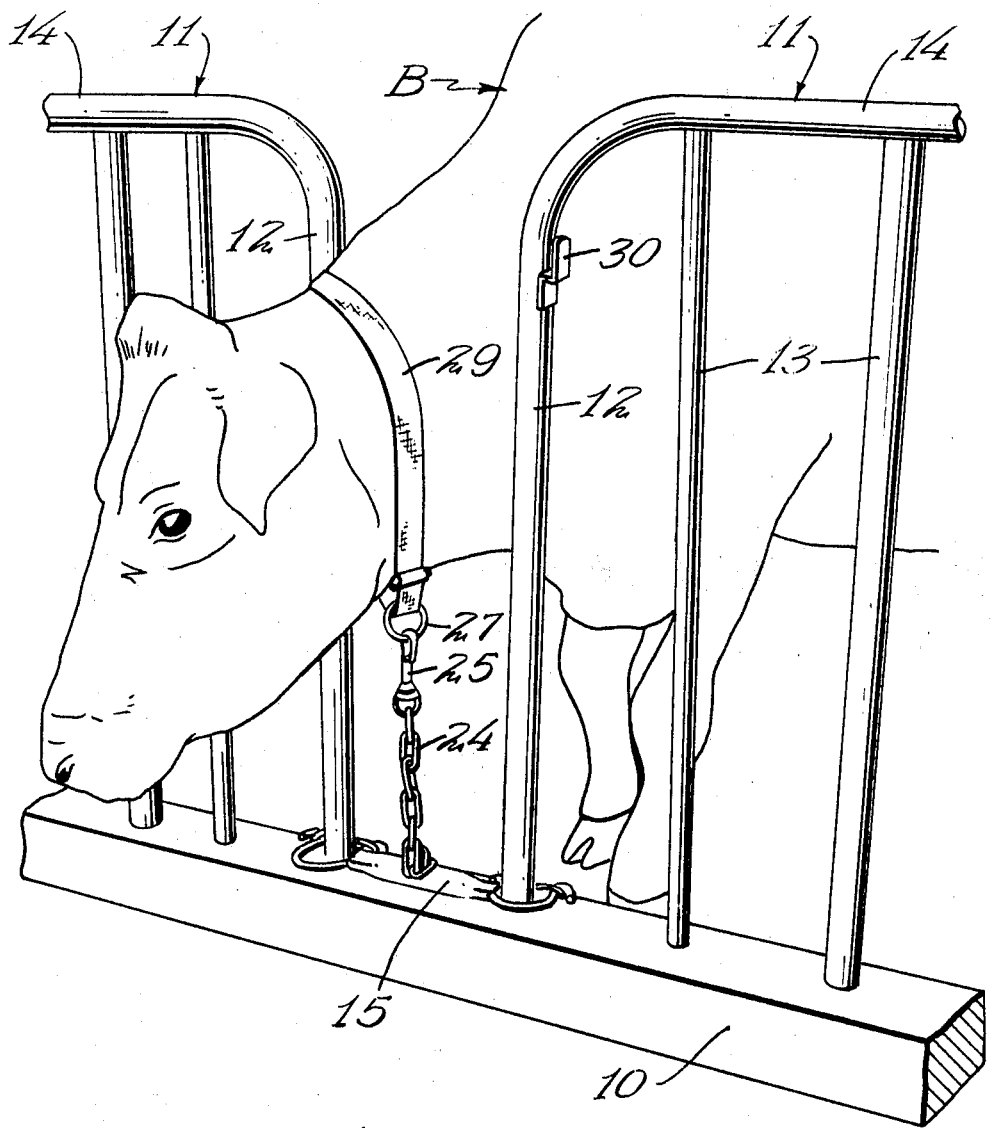
FIG. 1 is a perspective view of the forward end of a stall, showing the spaced stanchion bars and illustrating the cow tie connecting these bars to the neck of the animal.

Cattle stalls vary quite considerably in shape and form. However, in many instances, the forward ends of the stalls are bounded by a generally rectangular rib or curb 10 of concrete or similar material in which the vertical bars of the forward ends of the stalls are anchored. While not completely illustrated in the drawings, many such structures include generally U-shaped frame members 11 having vertical stanchion bars such as 12 forming the vertical sides of the members, the stanchion bars 12 being spaced apart a distance sufficient to permit the head and neck of the cow to extend therebetween. A series of vertical tubular members or bars such as 13 extend downwardly from the upper substantially horizontal members 14 and the lower ends of the cell forming members 13 are embedded in the concrete rib 10. The vertical members 13 are spaced apart a distance narrower than the head of the animal so that it is necessary for the head and neck of the animal to project between the stanchion bars 12 if it is to project forwardly from the stall.

The tie device includes a tie bar 15 which, in the form illustrated, comprises a tubular member having flattened ends 16 which are welded or otherwise secured to a pair of generally U-shaped or horseshoe shaped members 17. The horseshoe shaped members 17 are provided with a loop end 19 within which a link 20 or a short length of chain 21 is anchored. The other end of a chain 21 is adaptable to be hooked in the hook end 22 on the opposite ends of the members 17.

The U-shaped members 17 are of considerably greater radius than the stanchion bars 12, and accordingly the tie bar slides freely up and down the stanchion bars upon movement of the neck of the cow. The shape of these U-shaped members is such that it is almost impossible for them to bind in an intermediate position regardless of the direction of pull upon the tie bar by the cow.

Figure 4:
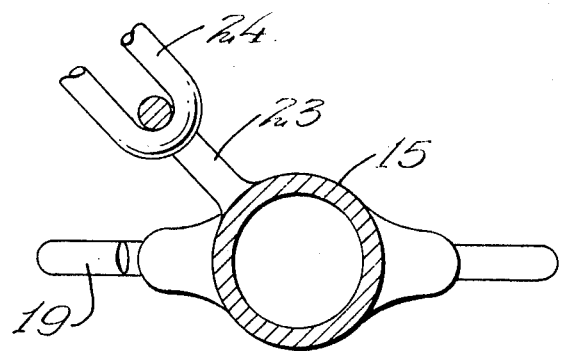
FIG. 4 is a sectional view through the tie bar, the position of the section being indicated by the line 4–4 of FIG. 3.

A loop 23 is anchored to the center portion of the tie bar 15 as is perhaps best illustrated in FIGS. 3 and 4 of the drawings. The loop 23 is welded or otherwise secured to the bar 15 to extend in a generally radial direction therefrom as indicated in FIG. 4. Considering the U-shaped members 17 to be on a substantially horizontal common plane, the loop 23 inclines upwardly and rearwardly toward the stall at an angle of approximately 45° to the horizontal. A short length of chain 24 is attached to the loop 23, and a snap hook 25 is mounted upon the free end of the chain 24 by means of a swivel connection 26. The swivel hook 25 is detachably connected to a ring 27 connected to a flexible band 20 encircling the neck of the cow B. When the band 29 is fastened about the neck of the cow, and the ring 27 on the belt 29 is secured to the snap 25, the cow is effectively tethered within the stall. At the same time, the animal may raise or lower her head and neck, and may move rearwardly in the stall without raising her head up and over the stanchion upright bar No. 12 and may return to her manger the same way, within the limits of the length of the chain 24.

Due to the fact that the tie bar comprises a rigid member rather than a flexible chain or the like, it is very difficult for the cow to injure herself on the cow tie. The chain 24 is usually not of sufficient length to permit the leg of the cow to become entangled in the chain, and for this reason the cow tie is very safe to use. At the same time, the device provides all of the movement necessary to give the cow the proper amount of freedom of movement.

Figure 6:
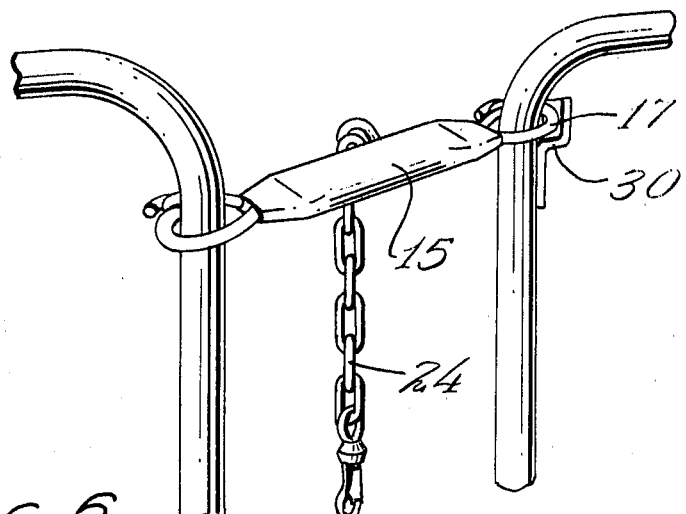
FIG. 6 is a front perspective view of the tie bar in cattle stop position.

In order to use the tie bar as a cattle stop, a hook-shaped projection 30 is mounted upon one of the stanchion bars at an elevation of perhaps 28 inches from the floor level. Before the cow enters the stall, the tie bar 15 may be grasped and raised until one of the U-shaped members 17 is engaged in the hook member 30. The tie bar is then held in position extending across the space between the stanchion bars in the manner illustrated in FIG. 6 of the drawings. From time to time, a cow will enter her stall, see the space between the stanchion bars, and attempt to jump through this space. The body of the cow then becomes wedged between the stanchion bars and the forward part of the cow must be lifted in order to release her. By positioning the tie bar extending across the stanchion bars in the manner shown in FIG. 6, this tendency is apparently overcome. When the cow arrives at the forward end of the stall, it is only necessary to attaCh the flexible strap about the neck of the cow and secure the chain 24 to the strap ring 27, or else to merely snap the chain 24 to the neck strap if this neck strap has been previously applied. The U-shaped member which has been supported by the hook 30 is then released, and the cow is teathered in the stall.

Figure 5:
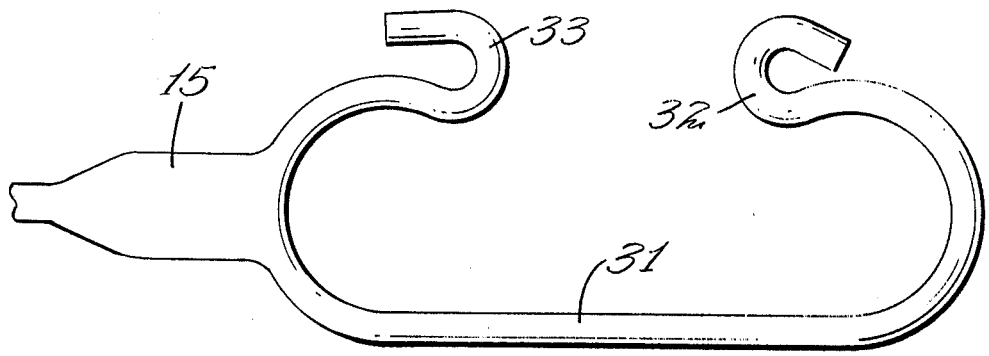
FIG. 5 is a plan view of a modified form of tie bar end construction.

In FIG. 5 of the drawings, I disclose a modified form of U-shaped member 31 which is welded or otherwise secured to an end of the tie bar 15. The only difference between the construction shown in FIG. 5 and that shown in FIG. 3 lies in the fact that the U-shaped member is relatively wide as compared to the U-shaped members 17. One end of the member 31 is provided with a loop 32 designed to accommodate a short length of chain, and the other end is provided with a hook member 33 which is engageable with the other end of the chain. The purpose of this modified form of construction is to permit the device to fit a wider assortment of stalls. While the stanchion bars are usually spaced apart a distance which is substantially standard, in some instances the spacing is increased. The U-shaped member 32 will also serve a construction in which the stanchion bars are not completely parallel and are wider apart at one elevation than at another.

It is my intention to provide a means of securely tying the animal; first for safety and second for freedom in the stall. I have found that cattle have been getting injured to the extent of death by cattle tying means. Extended experimentation has shown that the present structure is safe regardless of the position in which the cow is found. The cow has, as nearly as possible in a stall, the safety and freedom of a pasture.

I claim:

1. A cow tie for use in conjunction with a stall having a pair of spaced upright stanchion bars, the cow tie including;
   a tie bar,
   generally U-shaped loops having opposed sides and a connecting end, one side of each loop being secured to an end of said tie bar with the opposed sides of said loops being generally parallel and the connecting ends to one side of the axis of said tie bar and the open ends of said loops being on the other side of the axis of said tie bar, said loops being on a substantially common plane,
   detachable means connecting the ends of said opposed sides of each of said loops, said loops extending about said upright stanchions,
   a flexible connector secured to the center portion of said tie bar,
   a flexible neck encircling member adapted to encircle the neck of a cow, and
   means connecting said connector to said neck encircling member.

2. The structure of claim 1 and in which said detachable means comprises a short chain pivotally connected at one end to one end of each said U-shaped loop, and in which the other end of each said U-shaped loop includes a hook engageable with the other end of said short chain.

3. The structure of claim 1 and in which said tie bar includes a loop extending at an angle of substantially 45° to the plane of said loops, and to which said flexible connector is connected.

4. The structure of claim 1 and in which one of said stanchion bars includes projecting means near the upper ends thereof engageable with one of said loops to hold said tie bar extending across said stanchion bars near the upper ends thereof to block passage of a cow therebetween.